United States Patent
Yuan

(10) Patent No.: US 10,635,139 B2
(45) Date of Patent: Apr. 28, 2020

(54) CONNECTING APPARATUS, ROTATING SHAFT AND ELECTRONIC DEVICE

(71) Applicant: LENOVO (BEIJING) LIMITED, Beijing (CN)

(72) Inventor: Chunfeng Yuan, Beijing (CN)

(73) Assignee: Lenovo (Beijing) Limited, Beijing (CN)

(*) Notice: Subject to any disclaimer, the term of this patent is extended or adjusted under 35 U.S.C. 154(b) by 430 days.

(21) Appl. No.: 15/085,146

(22) Filed: Mar. 30, 2016

(65) Prior Publication Data

US 2017/0139445 A1    May 18, 2017

(30) Foreign Application Priority Data

Nov. 17, 2015 (CN) .......................... 2015 1 0789090
Nov. 17, 2015 (CN) .......................... 2015 1 0946369

(51) Int. Cl.
  *G06F 1/16* (2006.01)
(52) U.S. Cl.
  CPC ........... *G06F 1/1681* (2013.01); *Y10T 16/547* (2015.01)
(58) Field of Classification Search
  CPC .... G06F 1/1681; Y10T 16/547; Y10T 16/541; Y10T 16/53824; Y10T 16/53864;
  (Continued)

(56) References Cited

U.S. PATENT DOCUMENTS 8,959,719 B2* 2/2015 Hsu .................. G06F 1/1618
                                              16/303
8,978,206 B2* 3/2015 Hsu .................. F16H 19/08
                                              16/227
(Continued)

FOREIGN PATENT DOCUMENTS

CN    201314325 Y    9/2009
CN    203214575 U    9/2013
(Continued)

OTHER PUBLICATIONS

Chinese Patent Office,1st Office Action dated Aug. 15, 2017 re Application of Lenovo (Beijing) Co., Ltd., No. 201510946369.6, filed Nov. 17, 2015.
(Continued)

*Primary Examiner* — William L Miller
(74) *Attorney, Agent, or Firm* — Patrick J. Daugherty; Daugherty & Del Zoppo Co. LPA

(57) ABSTRACT

Aspects provide connecting apparatuses, rotating shafts and electronic devices. One connecting apparatus includes at least one pair of connecting strips connecting first and second shafts wherein the first shaft and the second shaft achieve synchronous rotation. In another assembly aspect a first rotating shaft is connected to a first body of an electronic device, a second rotating shaft is connected to a second body of the electronic device, and at least one transmission belt sheathed between the first and second rotating shafts synchronizes the torques of the first rotating shaft and the second rotating shaft. Embodiments solve technical problems of slim design for electronic devices that cannot be realized in the prior art, and achieve the technical effect of slim design for electronic devices.

20 Claims, 7 Drawing Sheets

(58) Field of Classification Search
CPC ..... E05D 3/06; E05D 3/122; E05Y 2900/606; H04M 1/022; H05K 5/0226
USPC ............. 16/366, 354, 282, 302; 379/433.13; 455/575.3; 361/679.27
See application file for complete search history.

(56) References Cited

U.S. PATENT DOCUMENTS

| | | | |
|---|---|---|---|
| 2005/0122671 | A1 | 6/2005 | Homer |
| 2013/0322004 | A1* | 12/2013 | Park .................. F16C 11/10 361/679.27 |
| 2014/0223693 | A1* | 8/2014 | Hsu .................. G06F 1/1681 16/282 |

FOREIGN PATENT DOCUMENTS

| | | |
|---|---|---|
| CN | 203322037 U | 12/2013 |
| CN | 203685838 U | 7/2014 |
| CN | 103982532 A | 8/2014 |
| CN | 204041721 U | 12/2014 |
| CN | 104791370 A | 7/2015 |
| CN | 205260601 U | 5/2016 |
| FR | 1346348 A | 12/1963 |

OTHER PUBLICATIONS

Chinese Patent Office, 1st Office Action dated Aug. 15, 2017 re Application of Lenovo (Beijing) Ltd., No. 201510789090.1, filed Nov. 17, 2015.

* cited by examiner

CONNECTING APPARATUS, ROTATING SHAFT AND ELECTRONIC DEVICE

FIELD OF THE INVENTION

The present invention relates to the fields of electronics and electronic technology, and more particularly to connecting apparatuses, rotating shafts and electronic devices.

BACKGROUND

Presently, with the development of electronic information technology, smart electronic devices such as smart phones, tablets, and laptops are widely spread and expending their range of use; and the appearance of electronic devices is becoming more diverse.

Wherein, using a dual structure to change the appearance of the electronic device is not uncommon in our daily lives. For example, flip phones that mainly comprise a display panel and the operator panel, laptops, hand-held game consoles that comprise an upper screen and a bottom screen, etc.

Currently, when an electronic device with a dual structure needs to achieve the synchronous movement of both structures in the same or opposite direction, biaxial synchronous gears are normally used to connect each body. FIG. 1 illustrates a biaxial synchronous gear system suitable for use with the embodiments of the present invention that relies on the linkage of crossed helical gears to achieve synchronous movement, and may comprise an upper gear, a middle gear and a bottom gear in a same arrangement direction, wherein a slim electronic device must compress the minimum size of the three gears to lessen the height of a dual structure electronic device. Since, in practice, electronic devices require certain strength biaxial synchronous gears based on the quality assurance, achieving a minimum size of the biaxial synchronous gear structure generally becomes a bottleneck in the design of slim and light type multi-structural electronic devices. It is obvious that in the prior art the biaxial synchronous gears are adopted to achieve synchronous movement of each component of an electronic device, but the occupying space is large and the materials are very heavy. Therefore, the prior art cannot solve the technical problem of slim design for electronic devices.

Moreover, for thin electronic devices, the height of an electric device in dual structures may be reduced by compressing the size of the three gears of FIG. 1 to the limit. However, as the biaxial synchronous gear strength depends on the electronic device quality during operation, the size of the biaxial synchronous gears usually constitutes the bottleneck for the structure design of thin electronic devices in the multiple structures. Therefore, as the biaxial synchronous gears in the existing technology are used for synchronous motion of all structure parts in electronic devices, the existence of the intermediate gear leads to a technical problem restricting further thickness reduction of electronic devices in the multiple structures.

SUMMARY

Aspects of the present invention provide connecting apparatuses, rotating shafts and electronic devices that solve technical problems associated with slim designs for electronic devices that cannot be realized in the prior art, and achieve the technical effect of slim design for electronic devices. Some aspects resolve existing technical problems wherein an intermediate gear restricts further thickness reduction of electronic devices in the multiple structures when the biaxial synchronous gears in the existing technology are used for synchronous motion of all structure parts in the electronic devices In one aspect a connecting apparatus comprises a first shaft, a second shaft; and at least one pair of connecting strips connecting the first shaft and the second shaft. As a function of the at least one pair of connecting strips, the first shaft and the second shaft achieve a synchronous rotation.

In another aspect an electronic device comprises a first body, a second body and a connecting apparatus that includes a first shaft fixed to the first body, a second shaft fixed to the second body, and at least one pair of connecting strips connecting the first shaft and the second shaft. Based on at least one pair of connecting strips, the first body and the second body achieve synchronous rotation via the first shaft and the second shaft.

In another aspect a rotating shaft, comprises a first rotating shaft that is configured to connect to a first main body of an electronic device; a second rotating shaft that is configured to connect to a second main body of the electronic device; and at least one transmission belt that is sheathed between the first rotating shaft and the second rotating shaft that synchronizes torques of the first rotating shaft and the second rotating shaft.

BRIEF DESCRIPTION OF DRAWINGS

In order to further clarify embodiments of the present application and technical solutions in the prior art, the following are brief introductions of drawings that are used to describe embodiments of the present application. It is obvious that the drawings in the following description are merely some embodiments for the present invention.

DETAILED DESCRIPTION OF THE INVENTION

Embodiments of the present invention provide a connecting apparatuses, rotating shafts and electronic devices used to solve the technical problem of slim design for electronic devices that cannot be realized in the prior art, and achieve the technical effect of slim design for electronic devices.

In solving the technical problems above, the general idea of the technical solution that embodiments of the present application present are as follows:

A connecting apparatus, comprising:
a first shaft;
a second shaft;
at least one pair of connecting strips connecting the first shaft and the second shaft, wherein, based on at least one pair of connecting strips, the first shaft and the second shaft can achieve the synchronous rotation.

In the technical solutions of the present application, at least one pair of connecting strips connects the first shaft and the second shaft, so that the synchronous rotation of the first shaft and the second shaft can be achieved. It can be seen that by replacing the middle gear of the biaxial synchronous gears with at least one pair of connecting strips, the technical solutions of the present application further reduce the thickness and weight of electronic devices, effectively overcome the technical defects of slim design development for multi-structural electronic devices, and therefore achieve the technical effect of slim design for electronic devices.

The term "and/or" in this application document, is a merely description of the relationship of relevant objects, indicates the three relations that possibly exist. For example, A and/or B, can indicate three conditions: only A; both A and B; only B. And, the mark "/" in this application document, generally indicates an "or" relationship of the objects before and behind the mark.

In order to better understand the technical solutions above, there are detailed introductions of the technical solutions of the present invention with drawings and embodiments. It should be understood that embodiments of the present application, as well as the specified features of the embodiments are detailed introductions for the technical solutions of the present invention, and are not a limit to the technical solutions of the present invention. Without conflict, the present application and specified features of the embodiments should be allowed to be combined.

Embodiment 1

Figure 1:
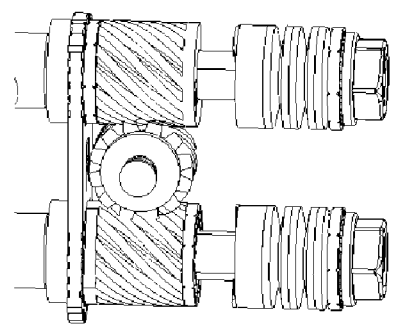
FIG. 1 is a structure diagram of the biaxial synchronous gears provided in embodiment 1 of the present application.
Figure 2:
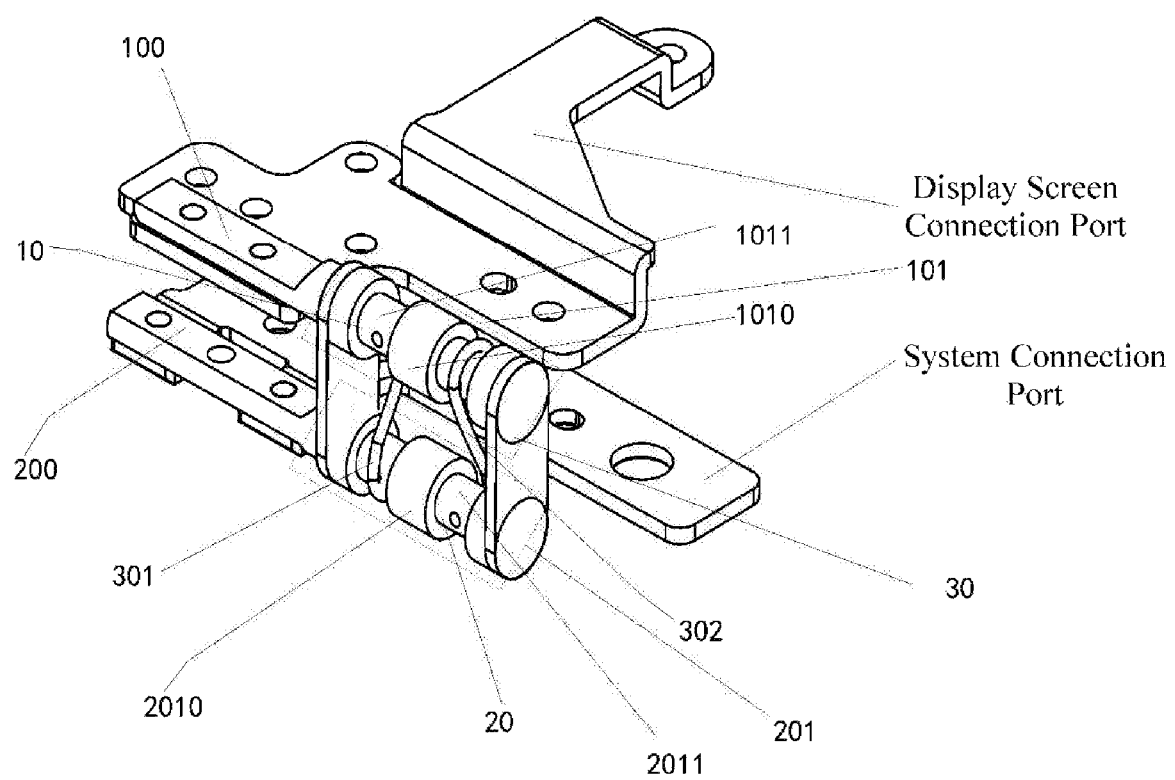
FIG. 2 is a structure diagram of the connecting apparatus provided in embodiment 1 of the present application.

Referring to FIG. 2, embodiment 1 of the present application provides a connecting apparatus, comprising:
a first shaft 10;
a second shaft 20;
at least one pair of connecting strips 30 connect the first shaft 10 and the second shaft 20, wherein, based on at least one pair of connecting strips 30, the first shaft 10 and the second shaft 20 can achieve synchronous rotation.

In the embodiment of the present invention, in order to maintain a stabilized form of the connecting apparatus, on the one hand, the first shaft 10 comprises: a first fixing body 100 for the first shaft 10 to the first body of the electronic device; the first shaft 10 further comprises the first shaft body 101, wherein the first shaft body 101 is fixed to one end of the first fixing body 100. On the other hand, the second shaft 20 comprises: a second fixing body 200 for fixing the second shaft 20 to the second body of the electronic device; a second shaft body 201 fixed to one end of the second fixing body 200;

In the specified implementation process, the first body and the second body can be two structural parts of an electronic device. These two structural parts can be part of an electronic device and together achieve a certain function. For example, the telephone handset and the body together can achieve the function of making and receiving calls.

The first body and the second body can further achieve different functions of an electronic device separately. For example, when an electronic device is specified as a dual screen cell phone, the first body may be one of the screens, and the second body may be the other screen. Another example, when the electronic device is specified as a laptop, the first body may be the display screen, and the second body may be the keyboard.

Further, the first body and the second body can also be different parts providing independent functions of an electronic system. For example, when the electronic device is specified as an intelligent environment control system, the first body may be a preset electronic thermometer, and the second body may be the master controlling device of the intelligent environment control system.

In the embodiment of the present invention, to ensure the at least one pair of connecting strips 30 can pull the first shaft 10 and the second shaft 20 and achieve synchronous rotation, and to ensure the at least one pair of connecting strips 30 can be wound around the first shaft 10 and the second shaft 20, the at least one pair of connecting strips 30 should be specified as being made of a flexible plastic material. For example, the at least one pair of connecting strips 30 should be specified as being made of a metal material or a flexible plastic material. For example, it can be made of copper, iron, or polyamide 6, polysulfone, and the like materials. For example, the at least one pair of connecting strips 30 are high strength steel wires. Since the flexible connecting strips have a good ductility, it can effectively avoid damaging the connecting apparatus, because of the excessive torque in the specified implementation process, thus improving the connection performance of the connecting apparatus and extending the service life of the connecting apparatus.

In the specified implementation process, since the first shaft 10 is fixed to the first body of an electronic device, and the second shaft 20 is fixed to the second body of an electronic device, and the at least one pair of connecting strips connecting the first shaft body 101 and the second shaft body 202; when an external force is applied on the first body of the electronic device and drives the first body to rotate, the rotation of the first shaft 10 also occurs. In this case, by the at least one pair of connecting strips 30 pulling the second shaft 20 to rotate, the first body and the second body achieve a certain angle between each other. In addition, the second shaft 20 further comprises the second shaft body 201, wherein, the second shaft body 201 is fixed on the one end of the second fixing body 200. In the specified implementation process, when an external force is applied on the second body of the electronic device and drives the second body to rotate, the rotation of the second shaft 20 also occurs. Furthermore, in the specified implementation process, at least one pair of connecting strips 30 connects the first shaft body 101 and the second shaft body 201, thus achieving the synchronous rotation of first shaft body 101 and the second shaft body 201. In other words, when an external force is applied, the first body and the second body can achieve a certain angle between each other by the rotation of first shaft 10 and the second shaft 20.

In the embodiment of the present invention, to fix the first shaft 10 to the first body, the first fixing body 100 has at least one first fixing structure engaged with the at least one second fixing structure on the first body so as to fix the first shaft 10 to the first body.

In the embodiment of the present application, to fix the second shaft 20 to the second body, the second fixing body 200 has at least one third fixing structure engaged with the at least one fourth fixing structure on the second body so as to fix the second shaft 20 to the second body;

In the embodiment of the present invention, in order to fix the first shaft 10 to the first body, in the specified implementation process, it can adopt the two following fixing methods, but is not limited to these two fixing methods.

A First Fixing Method

The first fixing method is specified as: when the at least one second fixing structure is specified as at least one first fixing hole, the at least one first fixing structure is then specified as at least one first fixing plug. Wherein, the at least one first fixing plug can be plugged in the relevant at least one first fixing hole at the corresponding position.

A Second Fixing Method

The second fixing method is specified as: when the at least one second fixing structure is specified as at least one first fixing plug, then the at least one first fixing structure is specified as at least one first fixing hole. Wherein, the at least one first fixing plug can be plugged in to the relevant at least one first fixing hole at the corresponding position.

In the specified implementation process, the first shaft 10 and the first body can be welded or riveted, and the second shaft 20 and the second body can be welded or riveted. Wherein, those skilled in the art can further design different fixing methods to fix the shafts and bodies according to certain needs, but it is not necessary repeat them herein.

In order to fix the second shaft 20 to the second body, the same fixing principle that fixes the first shaft 10 and the first body can be applied. When the at least one third fixing structure is specified as at least one second fixing hole, then the at least one fourth fixing structure is specified as at least one second fixing plug; or, when the at least one third fixing structure is specified as at least one second fixing plug, then the at least one fourth fixing structure is specified as at least one second fixing hole. And the at least one second fixing plug can be plugged in the relevant at least one second fixing hole at the corresponding position. Certainly, in the embodiment of the present application, it can adopt different fixing methods to fix the second shaft 20 to the second body, but it is not necessary repeat them herein.

In the embodiment of the present invention, a first shaft body 1010 comprises: at least two first shaft column 1010, the diameter of each first shaft column 1010 is the first diameter; at least one first shaft connecting section 1011, the diameter of each first shaft connecting section 1011 is the second diameter; wherein each adjacent first shaft column 1010 connects with each other via the first shaft connecting section 1011; wherein the first diameter is larger than the second diameter;

a second shaft body 201 comprises: at least two second shaft column 2010, the diameter of each second shaft column 2010 is the third diameter; at least one second shaft connecting section 2011, the diameter of each second shaft connecting section 2011 is the fourth diameter; wherein each adjacent second shaft column 2010 connects with each other by the second shaft connecting section 2011; wherein the third diameter is larger than the fourth diameter; wherein the third diameter can be the same to the first diameter, and their specified numerical value can be different.

The at least one pair of connecting strips 30 connects the first shaft connecting section 1011 and the second shaft connecting section 2011.

In the embodiment of the present invention, to connect the at least one pair of connecting strips 30 between the first shaft connecting section 1011 and the second shaft connecting section 2011, in the specified implementation process, at least one first through hole is arranged on each of the first shaft connecting section 1011; at least one second through hole is arranged on each of the second shaft connecting section 2011; and the at least one pair of connecting strips 30 is threaded through the at least one first through hole and the at least one second through hole. Certainly, those skilled in the art can further connect the first shaft connecting section 1011 and the second shaft connecting section 2011 with at least one pair of connecting strips 30 according to certain needs.

In the embodiment of the present invention, to achieve synchronous rotation of the first shaft 10 and the second shaft 20, the first pair of the at least one pair of connecting strips 30 comprises the first connecting strip 301 and the second connecting strip 302 that is different from the first connecting strip 301; wherein the first connecting strip 301 is disposed in the first region along the first direction of the axis of the shaft between the first shaft connecting section 1011 and the second shaft connecting section 2011; and the second connecting strip 302 is disposed in the second region along the second direction of the axis of the shaft between the first shaft connecting section 1011 and the second shaft connecting section 2011. In the specified implementation process, the shaft axial line is the axial line of the first shaft 10, or the axial line of the second shaft 20. For example, when the first connecting strip 301 is disposed in the first region between the first shaft connecting section 1011 and the second shaft connecting section 2011 along the counter-clockwise direction of the axis of the shaft the second connecting strip 302 is disposed in the second region between the first shaft connecting section 10 and the second shaft 20 along the clockwise direction of the axis of the shaft. For example, when the first connecting strip 301 is disposed in the first region between the first shaft connecting section 1011 and the second shaft connecting section 2011 along the counter-clockwise direction of the axis of the shaft the second connecting strip 302 is disposed in the second region between the first shaft connecting section 10 and the second shaft 20 along the clockwise direction of the axis of the shaft. Another example, when the first connecting strip 301 is disposed in the first region between the first shaft connecting section 1011 and the second shaft connecting section 2011 along the clockwise direction of the axis of the shaft, the second connecting strip 302 is disposed in the second region between the first shaft connecting section 10 and the second shaft 20 along the counter-clockwise direction of the axis of the shaft.

In the embodiment of the present invention, after the first body and the second body are at a closed state under the control of the connecting apparatus, at this time, it has various settings of the first connecting strip 301 and the second connecting strip 302 of the at least one pair of connection strips 30. The first setting can be specified as: the first end of the first connecting strip 301 is fixed at the first position of the first shaft connecting section 1011, the second end of the first connecting strip 301 is fixed at the second position of the second shaft connecting section 2011, the third end of the second connecting strip 302 is fixed at the third position of the first shaft connecting section 1011, the fourth end of the second connecting strip 302 is fixed at the fourth position of the second shaft connecting section 2011; wherein the connection line of the first axis center and the second axis center of the same end of the first shaft 10 and the second shaft 20, intersects with the outer periphery of the first shaft connection section 1011 at the first position, intersects with the outer periphery of the second shaft connection section 2011 at the second position; wherein the connection lines of the axis centers is specified as the line between the first shaft axis center and the second shaft axis center. And the first connecting strip 301 is wound around the shaft body of the second shaft connecting section 2011 along the first direction from the first position to the second position; the second connecting strip 302 is wound around the shaft body of the first shaft connecting section 1011 along the second direction from the fourth position to the third position. In other words, in the first case, the first connecting strip 301 of the at least one pair of connecting strips 30 is wound around the shaft body of the second shaft connecting section 2011 along the counter-clockwise direction from the first position to the second position; the second connecting strip 302 of the at least one pair of connecting strips 30 is wound around the shaft body of the first shaft connecting section 1011 along the clockwise direction from the fourth position to the third position.

Figure 3:
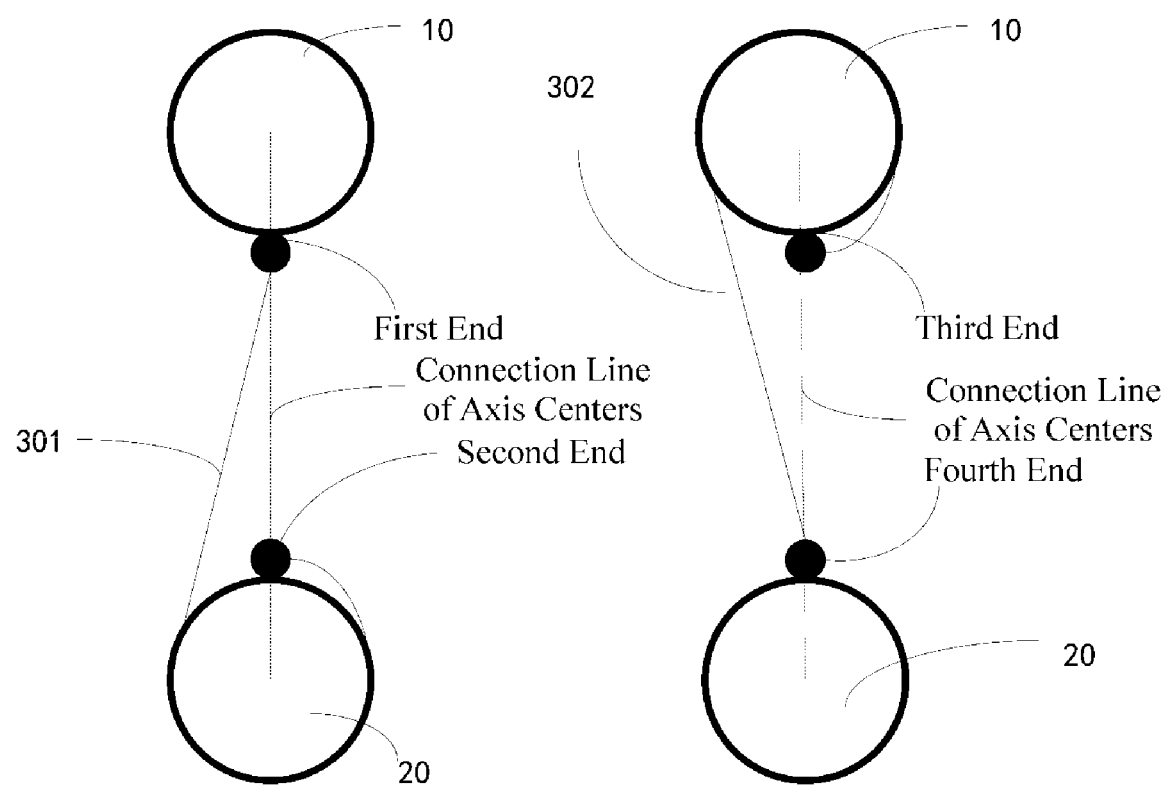
FIG. 3 is a connecting state diagram of one pair of the connecting strips while the angle of the connecting apparatus between the first body and the second body is 0° according to embodiment 1 of the present application.
Figure 4:
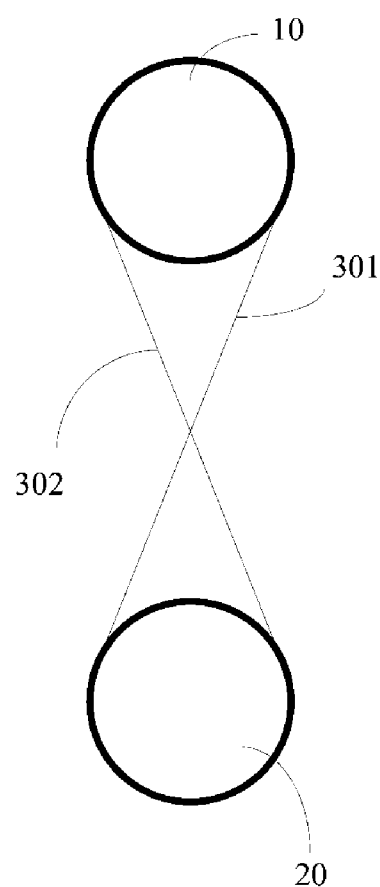
FIG. 4 is a side diagram of the connecting apparatus provided by embodiment 1 of the present application.

In the embodiment of the present invention, in order to ensure the connecting apparatus can adjust the specific angle between the first body and the second body according to the users' needs, in the specified implementation process, after the first body and the second body are at a closed state under the control of the connecting apparatus, the first angle between the first body and the second body is 0°, and the connecting state of one of the connecting strips in the connecting apparatus is as shown in FIG. 3. In view from the direction of the axial line of the first shaft 10 and the second shaft 20, the connecting state diagram of the one of the connecting strips of the connecting apparatus is shown as FIG. 4. When an external force is applied on the electronic device and drives the first shaft 10 of the connecting apparatus to rotate in the first direction, the first connecting strip 301 pulls the second shaft 20 to rotate in the second direction of the second shaft 20, and the fourth end of the second connecting strip 302 is wound around the shaft body of the second shaft 20 along the second direction, so that the first angle is adjusted from 0° to the first open angle. For example, when an external force is applied on the electronic device and drives the first shaft of the connecting apparatus to rotate in the clockwise direction, based on the synchronous motion of the first connecting strip, the first connecting strip pulls the second shaft 20 along the counter-clockwise direction, and in the meantime, the fourth end of the second connecting strip 302 is wound on the shaft body of the second shaft 20 along the counter-clockwise direction, so that the first angle is adjusted from 0° to any nonzero angle.

In the embodiment of the present invention, in order to ensure the connecting apparatus can adjust the specific angle between the first body and the second body according to the users' needs. In the process of adjusting the angle between the first body and the second body by the connecting apparatus driven by the external force, the detailed connecting state of at least one pair of the connecting strip 30 on the shaft body is as follows:

After the first body and the second body are at a closed state under the control of the connecting apparatus, the angle between the connection line of the first position and the first axis center and the connection line of the axis centers is 0. When an external force is applied on the electronic device and drives the first shaft 10 of the connecting apparatus to rotate in the first direction, the first end of the first connecting strip 301 is wound around the shaft body of the first shaft connecting section 1011 from the first position to the length of 1/N of the circumference of the shaft along the first direction, adjusting the angle between the connection line of the first position and the first axis center and the connection line of the axis centers from 0° to (2π/N). Based on the first connecting strip 301 that connects the first shaft 10 and the second shaft 20, the first shaft 10 and the second shaft 20 will achieve synchronous rotation. In this case, the second end is wound around the shaft body of the second shaft connecting section 2011 from the second position to the length of 1/N of the circumference of the shaft along the second direction, and the angle between the connection line of the second position and the second axis center and the connection line of the axis centers is adjusted from 0° to (2π/N), so that the first angle between the first body and the second body is adjusted from 0° to (4π/N); the third end of the second connecting strip 302 is wound around the shaft body of the first shaft connecting section 1011 from the third position to the length of 1/N of the circumference of the shaft along the first direction, the fourth end of the second connecting strip is wound around the shaft body of the second shaft connecting section 2011 from the fourth position to the length of 1/N of the circumference of the shaft along the second direction. The first connecting strip 301 and the second connecting strip 302 are tied in the opposite direction between the first shaft 10 and the second shaft 20, in the specified implementation process; therefore, when the first end of the first connecting strip is wound around the shaft body of the first shaft body 101 from the first position to the length of ½ of the circumference of the shaft along the counter-clockwise direction, the third end of the second connecting strip is wound off the shaft body of the first shaft body 101 from the third position to the length of ½ of the circumference of the shaft along the counter-clockwise direction. Because of the synchronous motion of the same connecting strip, it is hereby not necessary to repeat the winding state of the second end of the first connecting strip 301 and the fourth end of the second connecting strip 302 on the second shaft 201.

Figure 5:
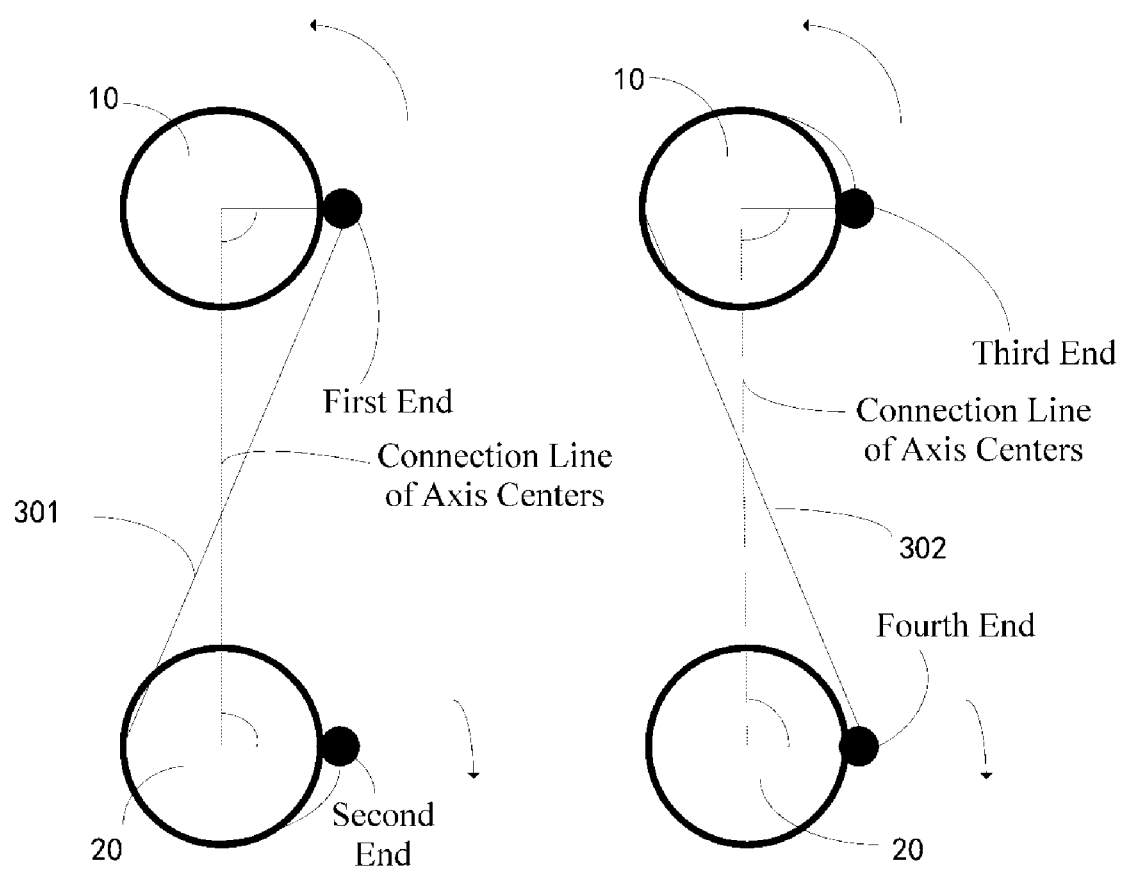
FIG. 5 is a connecting state diagram of one of the connecting strips while the angle of the connecting apparatus between the first body and the second body is 180°, according to embodiment 1 of the present application.

In the embodiment of the present application, an external force applied on the electronic device can drive the adjustment that changes the angle between the first body and the second body to an arbitrary angle. Herein, it is specified as the explanation of adjusting the angle between the first body and the second body from 0° to 180° that finally accomplishes the adjustment of shifting the closed mode to the tablet mode of a laptop. When an external force is applied on the electronic device and drives the first shaft 10 of the connecting apparatus to rotate in the first direction, the first end of the first connecting strip 301 is wound around the shaft body of the first shaft connecting section 1011 from the first position to the length of ¼ of the circumference of the shaft along the first direction, and the angle between the connection line of the first position and the first axis center and the connection line of the axis centers is adjusted from 0° to 90°; the second end is wound around the shaft body of the second shaft connecting section 2011 from the second position to the length of ¼ of the circumference of the shaft along the second direction, and the angle between the connection line of the second position and the second axis center and the connection line of the axis centers is adjusted from 0° to 90°, so that the first angle between the first body and the second body is adjusted from 0° to 180°. FIG. 5 is a connecting state diagram of the connecting apparatus after the adjustment.

In the specified implementation process, while the first body and the second body is a nonzero angle, the connecting state of the connecting apparatus when adjusting the angle between the first body and the second body to 0° of the closed mode, herein, is specified as the explanation of adjusting the angle between the first body and the second body from 180° to 0° that finally accomplishes the adjustment of shifting the tablet mode to the closed mode of a laptop. After the first body and the second body are at an open state under the control of the connecting apparatus, and the angle between the first body and the second body is 180°, when an external force is applied on the electronic device and drives the first shaft 10 of the connecting apparatus to rotate in the second direction, the third end will adjust the angle between the connection line of the third position and the first axis center and the connection line of the axis centers from 90° to 0°; the second connecting strip 302 pulls the second shaft 20 to rotate in the first direction, the fourth end adjusts the angle between the connection line of the fourth position and the second axis center and the connection line of the axis centers from 90° to 0°. In other words, after the electronic device is in tablet mode, when closing the electronic device in the clockwise direction, the first shaft turns 90° clockwise, and the second shaft turns 90° counter-clockwise, so that the angle between the first body and the second body is adjusted from 180° to 0°; and finally the electronic device is adjusted from tablet mode to the closed mode. In this case, the second end of the first connecting strip 301 is wound around the shaft body of the second shaft connecting section 2011 from the second position to the length of ½ of the circumference of the shaft along the first direction.

In the embodiment of the present invention, it can be based on the same inventive concept of adjusting the angle between the first body and the second body of the electronic device to any angle, but it is not necessary repeat it herein.

In the embodiment of the present invention, in order to fix the first connecting strip 301 to the specific position on the first shaft 10 and the second shaft 20, In the specified implementation process, the first through hole is arranged at the first position, and the second through hole is arranged at the second position, so that the first end of the first connecting strip is penetrated at the first position and the second end of the first connecting strip is penetrated on the second position. Certainly, those skilled in the art can further fix each end of the at least one pair of connecting tape 30 on the first shaft and the second shaft by other methods, but it is not necessary repeat them herein.

In the embodiment of the present invention, in order to avoid the slipping of the at least a pair of connecting strip 30 affecting the connection and causing malfunction of the connecting apparatus during the process of synchronous rotation of the first body and the second body driven by the connecting apparatus, in the specified implementation process, at least one first groove on each first shaft connecting section 1011 should be carved; at least one second groove on each second shaft connecting section 2011 should be carved; and at least one pair of connecting strips 30 should be placed in the relevant grooves. In the specified implementation process, the grooves can be carved on only the first shaft 10 or on the second shaft 20, and further can be carved on the first shaft 10 and the second shaft 20 simultaneously. When there are a plurality of grooves on the shaft bodies of the first shaft 10 and the second shaft 20, the connecting strips can be placed in one or more grooves. In the specified implementation process, those skilled in the art can make specific settings according to certain needs, but it is not necessary repeat them herein.

Example 2

Figure 6:
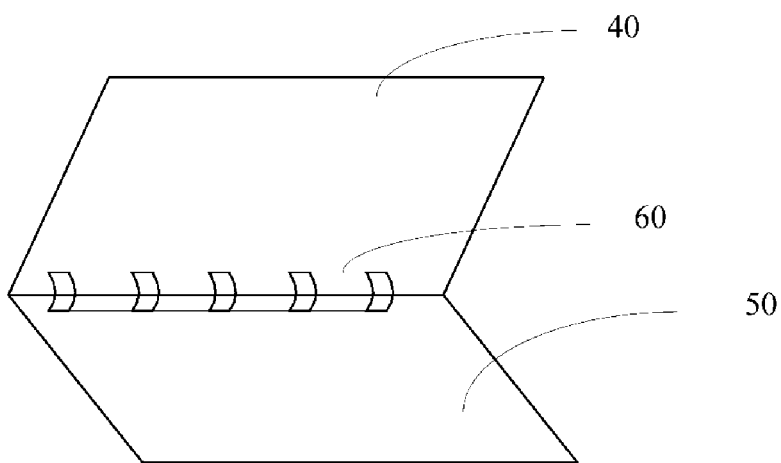
FIG. 6 is a structure diagram of a detail electronic device applying of the connecting apparatus according to embodiment 2 of the present application.

Referring to FIG. 6, based on same inventive concept of the embodiment 1 of the present application, the embodiment of the present application further provides an electronic device, including:

a first body 40;
a second body 50;
a connecting apparatus 60, comprising: a first shaft fixed to the first body 40; a second shaft fixed to the second body 50; at least one pair of connecting strips connecting the first shaft and the second shaft; wherein, based on at least one pair of connecting strips, the first body 40 and the second body 50 can achieve synchronous rotation by the synchronous rotation of the first shaft and the second shaft.

In the embodiment of the present invention, the first shaft comprises: a first fixing body, for fixing the first shaft to the first body 40 of the electronic device; a first shaft body fixed to one end of the first fixing body;

the second shaft comprises: a second fixing body, for fixing the second shaft to the second body 50 of the electronic device; a second shaft body, fixed to one end of the second fixing body;

the at least one pair of connecting strips connecting the first shaft body and the second shaft body.

In the embodiment of the present invention, the first fixing body has at least one first fixing structure engaged with the at least one second fixing structure on the first body 40 so as to fix the first shaft to the first body 40;

the second fixing body has at least one third fixing structure engaged with the at least one fourth fixing structure on the second body 50, so as to fix the second shaft to the second body 50.

In the embodiment of the present application, when the at least one second fixing structure is specified as at least one first fixing hole, the at least one first fixing structure is then specified as at least one first fixing plug; or when the at least one second fixing structure is specified as at least one first fixing plug, the at least one first fixing structure is then specified as at least one first fixing hole.

In the embodiment of the present invention, the first shaft body comprises: at least two first shaft columns, the diameter of each first shaft column is the first diameter; at least one first shaft connecting section, the diameter of each first shaft connecting section is the second diameter; wherein each two adjacent first shaft columns connect to each other via the first shaft connecting section; wherein the first diameter is larger than the second diameter;

the second shaft body comprises: at least two second shaft columns, the diameter of each second shaft column is the third diameter; at least one second shaft connecting section, the diameter of each second shaft connecting section is the fourth diameter; wherein each two adjacent second shaft column connect to each other via the second shaft connecting section; wherein the third diameter is larger than the fourth diameter;

the at least one pair of connecting strips, connecting the at least one first shaft connecting section and the at least one second shaft connecting section.

In the embodiment of the present invention, a first through hole is arranged on each of the first shaft connecting sections, there should be at least one first through hole; a second through hole is arranged on each of the second shaft connecting sections, there should be at least one second through hole; wherein the at least one pair of connecting strips is threaded through the at least one first through holes and the at least one second through hole In the embodiment of the present invention, the first pair of the at least one pair of connecting strips comprise the first connecting strip and the second connecting strip that is different from the first connecting strip; wherein the first connecting strip is disposed in the first shaft connecting section and the second shaft connecting section along the first direction of the axis of the shaft in the first region between the first shaft connecting section and the second shaft connecting section; and the second connecting strip is disposed in the first shaft connecting section and the second shaft connecting section along the second direction of the axis of the shaft in the second region between the first shaft connecting section and the second shaft connecting section In the embodiment of the present invention, after the first body 40 and the second body 50 are at a closed state under the control of the connecting apparatus 60, the first end of the first connecting strip is fixed at the first position of the first shaft connecting section, the second end of the first connecting strip is fixed at the second position of the second shaft connecting section, the third end of the second connecting strip is fixed at the third position of the first shaft connecting section, the fourth end of the second connecting strip is fixed at the fourth position of the second shaft connecting section; wherein the connection line of the first axis center and the second axis center of the same end of the first shaft and the second shaft, intersects with the outer periphery of the first shaft connection section at the first position, intersects with the outer periphery of the second shaft connection section at the second position; wherein the first connecting strip is wound around the shaft body of the second shaft connecting section along the first direction from the first position to the second position; the second connecting strip is wound around the shaft body of the first shaft connecting section along the second direction from the fourth position to the third position In the embodiment of the present invention, after the first body 40 and the second body 60 are at a closed state under the control of the connecting apparatus 60, the first angle between the first body 40 and the second body 50 is 0°, when an external force is applied on the electronic device and drives the first shaft of the connecting apparatus 60 to rotate in the first direction, the first connecting strip pulls the second shaft to rotate in the second direction of the second shaft, and the fourth end of the second connecting strip is wound on the shaft body of the second shaft along the second direction, so that the first angle is adjusted from 0° to the first open angle.

In the embodiment of the present invention, after the first body 40 and the second body 50 are at a closed state under the control of the connecting apparatus 60, when an external force is applied on the electronic device and drives the first shaft of the connecting apparatus 60 to rotate in the first direction, the first end of the first connecting strip is wound around the shaft body of the first shaft connecting section from the first position to the length of 1/N of the circumference of the shaft along the first direction, adjusting the angle between the connection line of the first position and the first axis center and the connection line of the axis centers from 0° to (2π/N), the second end of the first connecting strip is wound around the shaft body of the second shaft connecting section from the second position to the length of 1/N of the circumference of the shaft along the second direction, and the angle between the connection line of the second position and the second axis center and the connection line of the axis centers is adjusted from 0° to (2π/N), thus adjusting the first open angle between the first body 40 and the second body 50 from 0° to (4π/N); the third end of the second connecting strip is wound around the shaft body of the first shaft connecting section from the third position to the length of 1/N of the circumference of the shaft along the first direction, the fourth end of the second connecting strip is wound around the shaft body of the second shaft connecting section from the fourth position to the length of 1/N of the circumference of the shaft along the second direction In the embodiment of the present invention, after the first body 40 and the second body 50 are at a closed state under the control of the connecting apparatus 60, when an external force is applied on the electronic device and drives the first shaft of the connecting apparatus 60 to rotate in the first direction, the first end of the first connecting strip is wound around the shaft body of the first shaft connecting section from the first position to the length of ¼ of the circumference of the shaft along the first direction, adjusting the angle between the connection line of the first position and the first axis center and the connection line of the axis centers from 0° to 90°; the second end of the first connecting strip is wound around the shaft body of the second shaft connecting section from the second position to the length of ¼ of the circumference of the shaft along the second direction, and the angle between the connection line of the second position and the second axis center and the connection line of the axis centers is adjusted from 0° to 90°, so that the first angle between the first body and the second body is adjusted from 0° to 180°.

In the embodiment of the present invention, after the first body 40 and the second body 50 are at an open state under the control of the connecting apparatus 60, and the angle between the first body 40 and the second body 50 is 180°, when an external force is applied on the electronic device and drives the first shaft of the connecting apparatus 60 to rotate in the second direction, the third end of the second connecting strip is wound around the shaft body of the second shaft connecting section from the third position to the length of ¼ of the circumference of the shaft along the first direction, and the angle between the connection line of the third position and the first axis center and the connection line of the axis centers is adjusted from 90° to 0°; the second connecting strip pulls the second shaft to rotate in the first direction of the second shaft, the fourth end of the second connecting strip is wound around the shaft body of the first shaft connecting section from the fourth position to the length of ¼ of the circumference of the shaft along the second direction, and the angle between the connection line of the fourth position and the second axis center and the connection line of the axis centers is adjusted from 90° to 0°, thus adjusting the angle between the first body 40 and the second body 50 from 180° to 0°, and the second end of the first connecting strip is wound around the shaft body of the second shaft connecting section from the second position to the length of ½ of the circumference of the shaft along the first direction.

In the embodiment of the present application, the first through hole is arranged at the first position, and the second through hole is arranged at the second position, so that the first end of the first connecting strip is penetrated at the first position and the second end of the first connecting strip is penetrated on the second position.

In the embodiment of the present invention, at least one first groove is carved on each first shaft connecting section and at least one second groove is carved on each second shaft connecting section; and wherein at least one pair of connecting strips are placed in the relevant grooves.

The one or more technical solutions in the embodiment of the present invention have at least one or more of the following technical effects:

In the technical solutions of the present application, at least one pair of connecting strips, connecting the first shaft and the second shaft, thus achieving synchronous rotation of the first shaft and the second shaft. It can be seen that by replacing the middle gear of the biaxial synchronous gears with at least one pair of connecting strips, the technical solutions of the present application further reduce the thickness and weight of electronic devices, effectively overcome the technical defects of slim design development for multi-structural electronic devices, and therefore achieve the technical effect of slim design for electronic devices.

In the technical solution of the present application, by applying the at least one pair of connecting strips, connecting the first shaft and the second shaft, it can exert counterforce through its strong adaptability when relative motion of the e first shaft and the second shaft occur due to an irregular external force, thus ensuring synchronous rotation of the first shaft and the second shaft, as well as ensuring that connecting apparatus has a good convergence effect.

In the technical solution of the present application, it adopts the connecting apparatus that has at least one pair of connecting strips, connecting the first shaft and the second shaft. On the one hand, it lowers the design cost of the connecting apparatus; on the other hand, it reduces complexity of the connecting apparatus.

Aspects of the present invention also provide rotating shafts used to solve the existing technical problem of the gear restricting further thickness reduction of electronic devices in the multiple structures when the biaxial synchronous gears in the existing technology are used for synchronous motion of all structure parts in the electronic devices.

To resolve the foregoing technical problem, the overall guideline of the technical solution in the embodiments of this application is as follows:

For the technical solution in the embodiments of this application, the synchronous torques of the first rotating shaft and the second rotating shaft are realized by connecting the first rotating shaft to the first main body of the electronic device, connecting the second rotating shaft to the second main body of the electronic device and sheathing at least one transmission belt between the first rotating shaft and the second rotating shaft. The technical solution in the embodiments of the present application uses the transmission belt to replace the intermediate gear between the biaxial synchronous gears to avoid the intermediate gear between the first and second rotating shafts, and further reduce the thickness of the electronic device; and the solution has the following technical effects: overcoming the technical defects of restricting the multiple-structure electronic device from further developing with less weight and smaller thickness, reducing the production cost, further lowering the processing complexity and improving the production and processing efficiency.

The following section describes the technical solution of this application in details by use of the attached drawings and specific embodiments while the embodiments of this application and the specific features hereof shall be comprehended as a detailed description of the technical solutions in this application, but not as restrictions for the technical solutions in this application, so the embodiments of this application and the technical features hereof can be combined in the case that there are no conflicts.

The term "and/or" herein is only an incidental relation describing the instanced objects and it indicates the possibility of three relations, for example, A and/or B can express the three conditions: A separately exists; both A and B exist at the same time; and B separately exists. In addition, the character "/" herein generally indicates the "or" relation for the former and latter instanced objects.

Embodiment 3

Figure 7:
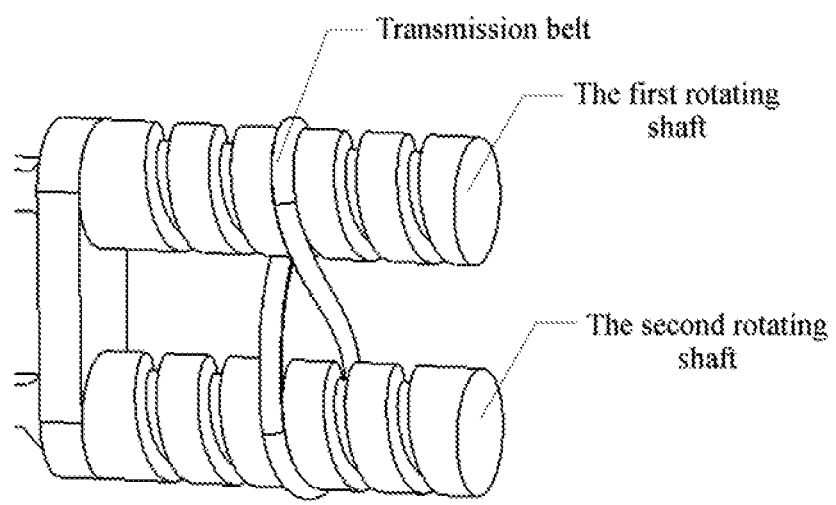
FIG. 7 is a structure diagram of a rotating shaft in an embodiment of the present invention.

Please refer to FIG. 7, wherein the Embodiment 3 of this application provides a rotating shaft comprising:

The first rotating shaft, used to connect the first main body of the electronic device;

The second rotating shaft, used to connect the second main body of the electronic device;

At least one transmission belt, sheathed between the first rotating shaft and the second rotating shaft to synchronize the torques of the first and second rotating shafts.

The first main body and the second main body can be two structural parts of an electronic device. The two structural parts can be the parts used together to realize a certain function of the electronic device. For instance, the earphone and the main body of a telephone can be used together for dialing and answering functions.

The first main body and the second main body can further be parts respectively realizing varied functions of the electronic device. For instance, when the electronic device is a specific mobile phone with double screens, the first main body is one of the screens and the second main body is the other.

The first main body and the second main body can be parts with independent functions of an electronic system. For instance, when the electronic device is a specific intelligent environment control system, the first main body can be the electronic thermometer arranged in the default environment and the second main body can be the master control equipment only used for the environment control system.

In the embodiments of this application, the transmission belt can be used to replace the intermediate gear between the biaxial synchronous gears When the first rotating shaft rotates, the second rotating shaft is driven by the tension and friction of the transmission belt to rotate with the first rotating shaft at the same time. On the other hand, so does the second rotating shaft during rotation. Similarly, if the first rotating shaft connected to the first main body rotates, the second rotating shaft connected to the second main body consequently rotates at the same time through the transmission belt; in this case, when the first main body in the electronic device produces displacement due to rotation of the first rotating shaft, the second main body of the electronic device produces displacement with the first main body due to synchronous motion. Because the transmission belt can take the mode of fitting the edges of the first and second rotating shafts during implementation, the synchronous motion of the first and second rotating shafts remains if the distance is short between the first and second rotating shafts for the avoidance of the intermediate gear; or the intermediate gear must be used between the first rotating shaft and the second rotating shaft during application; therefore, this solution can further reduce the thickness of the electronic device.

Meanwhile, the technical solution in the embodiments of this application realizes the synchronous motion of the second rotating shaft only with the transmission belt but not the gear. Therefore, it is unnecessary to use the complicated parts during production.

The technical solution in the embodiments of the present application uses the transmission belt to replace the intermediate gear between the biaxial synchronous gears to avoid adding the intermediate gear between the first and second rotating shafts, and further reduce the thickness of the electronic device; and the solution has the following technical effects: overcoming the technical defects of restricting the multiple-structure electronic device from further developing with less weight and smaller thickness, reducing the production cost, further lowering the processing complexity and improving the production and processing efficiency.

Optionally, the transmission belt is a flexible connecting belt.

As the flexible transmission belt has better ductility than the nonflexible belts, the flexible belt can reduce the damage probability under strong torque during operation and extend the service life of the rotating shaft in the technical solution for the embodiments of this application.

On the other hand, as the flexible belt highlights better flexibility, the belt can adapt its shape for various changes of the first and the second rotating shafts during operation, for example, when the first and second rotating shafts rotate at the asymmetrical speeds under the external force, the flexible belt can be adjusted through its adaptability to such changes to exert the relative action for synchronization of the first and second rotating shafts.

In addition, as the flexible belt in a certain size can closely fit the outer edges of the first and second rotating shafts, the use of the flexible belt can save the space occupied by the rotating shaft and further tuck the rotating shaft structure.

Therefore, the technical solution in the embodiments of this application can reduce the possible damages to the rotating shaft in the embodiments of this application by use of the flexible belt. When the first rotating shaft and the second rotating shaft take irregular relative motions under external force, it is possible to exert a counterforce through the strong adaptability for synchronization between the first rotating shaft and the second rotating shaft. Meanwhile, the solution has the technical effects of further tucking the rotating shaft structure.

Optionally, the transmission belt is 8-shaped and sheathed between the first rotating shaft and the second rotating shaft.

Figure 8:
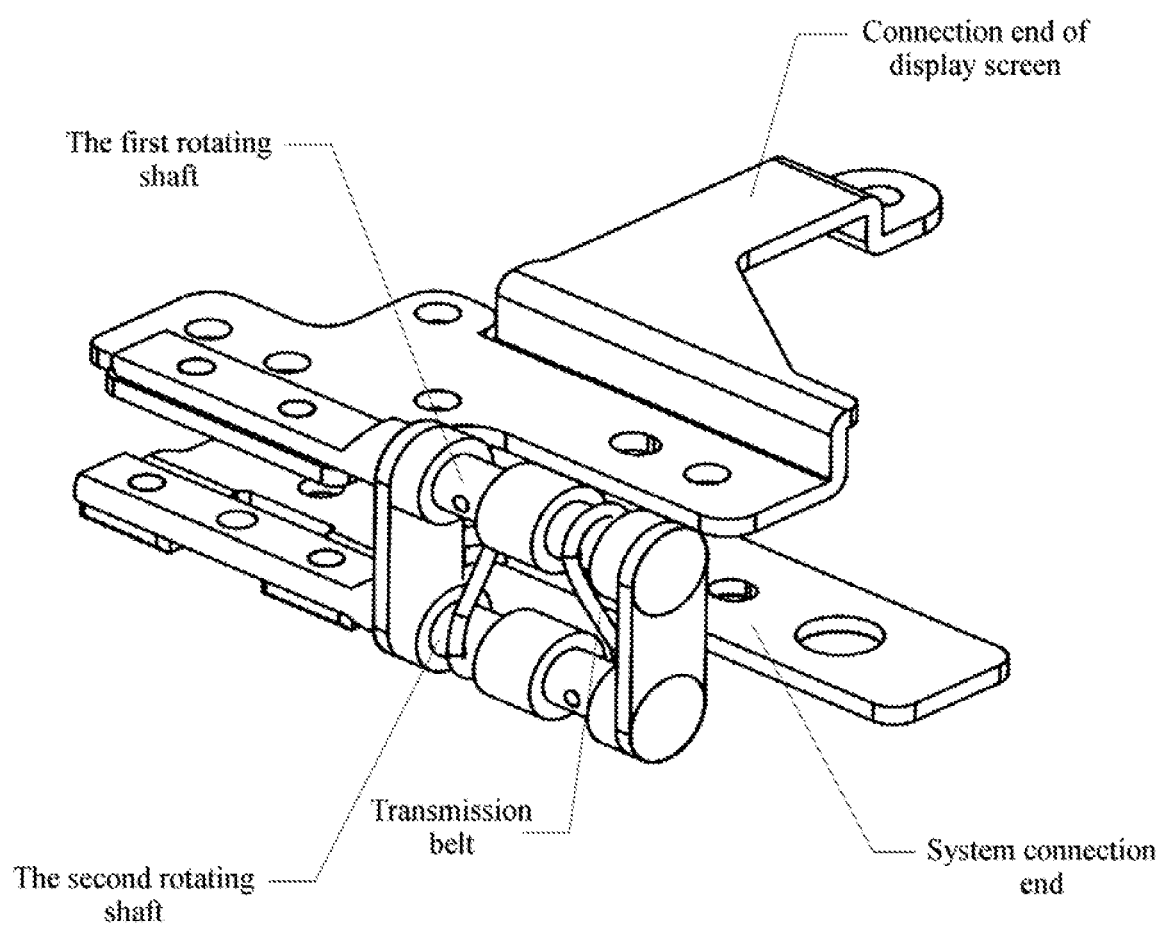
FIG. 8 is a structure diagram of a rotating shaft applied in an electronic device for an embodiment of the present invention.

The transmission belt is a figure 8 sheathed between the first and second rotating shafts to increase the torque and the consequential interaction between the transmission belt and the first and second rotating shafts. Therefore, the solution can enhance the technical effects of sensitivity and fitness between the first and second rotating shafts during synchronization.

In other words, as the transmission belt is sheathed between the first and second rotating shafts in the shape of figure 8, even if the first rotating shaft rotates to a small arc, the second rotating shaft rotates accordingly to the small arc and vice versa.

As the transmission belt is sheathed between the first and second rotating shafts in the shape of figure 8 for synchronous motion of the first and second rotating shafts, the two shafts rotate towards the opposite directions. Therefore, the solution can be used in the applications requiring the rotation in the opposite directions during the synchronous motion of the first and second main bodies.

Therefore, for the technical solution in the embodiments of this application, the transmission belt is sheathed between the first and second rotating shafts in the shape of a figure 8 to increase the interaction between the transmission belt and the first and second rotating shafts. The solution can enhance the technical effects of sensitivity and fitness between the first and second rotating shafts during synchronization. Meanwhile, as the transmission belt in the technical solution is sheathed between the first and second rotating shafts in the shape of figure 8, the solution can be widely used in the applications requiring the rotation in the opposite directions during the synchronous motion of the first and second main bodies.

Optionally, a through-hole is further drilled on the transmission belt and a portion of the transmission belt runs through the through-hole to form the 8-shape.

A through-hole is arranged on the transmission belt and a portion of the transmission belt constituting "8" shape runs through the through-hole to avoid two overlapped sections at the 8-shaped intersection with the wide transmission belt and expand the application scope of the transmission belt.

Therefore, for the technical solution in the embodiments of this application, a through-hole is drilled on the transmission belt and a portion of the transmission belt constituting the "8" shape runs through the through-hole to improve the convergent degree of the transmission belt, so the solution highlights the technical effects of improving the space utilization efficiency of the rotating shaft.

Optionally, at least one convex tooth is arranged on the body of the first rotating shaft and/or the second rotating shaft;

The transmission belt is sheathed onto one convex tooth at least.

In the embodiments of this application, a punched hole can be arranged on the transmission belt, corresponding to the convex tooth on the first and/or second rotating shaft(s); when the first and/or second rotating shaft(s) rotates, the convex tooth is dynamically inserted into the corresponding hole on the transmission belt with the shaft rotation, like the chain motion mode for bicycle riding.

Without a doubt, the transmission belt can be free of perforation during operation, but take the tooth-groove mating mode to realize the engagement between the transmission belt and the shaft; in this case, the friction force increases between the transmission belt and the first and second rotating shafts to get the synchronous effects.

Optionally, at least one recess hole is arranged on the body of the first rotating shaft and/or the second rotating shaft;

A convex pole is arranged on the transmission belt, corresponding to at least one recess hole, and the convex pole can be inserted into the corresponding recess hole during transmission.

During operation, a convex pole is further arranged on the transmission belt while one mating recess hole or groove is arranged on the first and/or second rotating shaft(s) to realize the engagement between the transmission belt and the shaft; in this case, the friction force increases between the transmission belt and the first and second rotating shafts to get the synchronous effects.

Optionally, at least one shaft tooth is arranged on the body of the first rotating shaft and/or the second rotating shaft;

A belt tooth is arranged on the transmission belt, corresponding to at least one shaft tooth, and the belt tooth is engaged with the corresponding shaft tooth during transmission.

During operation, at least one belt tooth is further drilled on the transmission belt and the shaft teeth corresponding to one or more belt teeth on the transmission belt are arranged on the first and/or second rotating shaft(s) so that at least one belt tooth is engaged with the corresponding shaft tooth in a teethed engagement pattern during synchronization; in this case, the friction force increases between the transmission belt and the first and second rotating shafts to get the synchronous effects.

In other words, for the technical solution in the embodiments of this application, a convex gear and its mating structure can be further arranged respectively on the transmission belt and the shaft so that the transmission belt is engaged with the shaft and the solution can validly increase the friction force between the transmission belt and the shaft to improve the technical effect of synchronous sensitivity.

Therefore, for the technical solution in the embodiments of this application, a convex gear and its mating structure can be further arranged respectively on the transmission belt and the shaft so that the transmission belt is engaged with the shaft for synchronization between the first and second rotating shafts; therefore, the solution can validly increase the friction force between the transmission belt and the shaft to improve the technical effect of synchronous sensitivity.

Optionally, at least one groove is arranged on the body of the first rotating shaft and/or the second rotating shaft;

The transmission belt is sheathed in at least one groove.

In the case that the transmission belt is sheathed in the groove, because the transmission belt can be fixed by both edges into the groove to prevent the belt from slipping away when the belt actuates the synchronous motions of the first and second rotating shafts, the solution has the technical effects of validly reducing the fault possibility of the rotating shaft in this application.

During operation in the embodiments of this application, it is possible to arrange the grooves only on the first rotating shaft. It is further possible to arrange the grooves only on the second rotating shaft. Without a doubt, the grooves can be arranged on the first and second rotating shafts at the same time. When multiple grooves are arranged on the first and second rotating shafts, the transmission belt can be only sheathed in one or more grooves. The arrangements depend on demands during operation.

Therefore, for the technical solutions in the embodiments of this application, at least one groove is arranged on the first and/or second rotating shaft(s) and the transmission belt is sheathed in one groove at least to fix the belt between the first and second rotating shafts, or the transmission belt may slip away leading to invalidity when the belt actuates the synchronous motions of the first and second rotating shafts; and the solution has the technical effects of validly reducing the fault possibility of the rotating shaft in this application.

Optionally, at least one groove is a spiral groove running around the shaft.

As the spiral groove is applied, the transmission belt sheathed in the spiral groove can shape a bigger torque onto the shaft during rotation of the first and/or second rotating shaft(s). Therefore, the force applied on the transmission belt decreases when the first and/or second rotating shaft(s) rotates to the same radian.

For the technical solution in the embodiments of this application, at least one groove can be a spiral groove around the shaft so that the force applied on the transmission belt decreases with the technical effects of extending the rotating shaft service life when the first and/or second rotating shaft(s) rotates to the same radian.

Optionally, the transmission belt is made of metal materials.

As metal materials have reliable resistance to tension and extreme temperature, metal parts are durable during operation, without any substantial deformation or performance change due to varied season and service environment, not affecting the use of rotating shafts in the technical solutions herein.

Therefore, for the technical solution in the embodiments of this application, the transmission belt can be made of metal materials with better resistance to tension and weather so as to get the technical effects of extending the service life and expanding the applicable scope related to the rotating shaft in this application.

Please refer to FIG. 8 wherein the rotating shafts in the embodiments of this application can be used in the electronic devices comprising a system end and a display screen. The first main body is the connection end of the display screen and the second main body is the system connection end. When the screen connection end relative to the first rotating shaft rotates upward with the first rotating shaft as the circle center of circler under the external force, the first rotating shaft rotates resulting in reverse rotation of the second rotating shaft through synchronous actuation of the transmission belt. In other words, when the first rotating shaft rotates upward relative to the second rotating shaft, the second rotating shaft rotates downward relative to the first rotating shaft under synchronous actuation of the transmission belt. The first rotating shaft is connected to the screen connection end and the second rotating shaft is connected to the system connection end so that the connection ends of the screen and the system rotate towards the opposite directions. Therefore, users can realize the rotation of the screen connection end relative to the first or second rotating shaft only with an external force, while the system connection end rotates toward the opposite direction relative to the screen connection end and the first or second rotating shaft under the synchronous action of the transmission belt to get the effects of pulling the screen connection end apart from the system connection end. Without a doubt, the users can get the rotation of the system connection end relative to the first or second rotating shaft only with an external force, while the screen connection end rotates toward the opposite direction relative to the screen connection end and the first or second rotating shaft under the synchronous action of the transmission belt.

Therefore, for the technical solution in the embodiments of this application, the synchronous torques of the first rotating shaft and the second rotating shaft are realized by connecting the first rotating shaft is connected to the first main body of the electronic device, connecting the second rotating shaft to the second main body of the electronic device and sheathing at least one transmission belt between the first rotating shaft and the second rotating shaft. The technical solution in the embodiments of the present application uses the transmission belt to replace the intermediate gear between the biaxial synchronous gears to avoid adding the intermediate gear between the first and second rotating shafts, and further reduce the thickness of the electronic device; and the solution has the following technical effects: overcoming the technical defects of restricting the multiple-structure electronic device from further developing with less weight and smaller thickness, reducing the production cost, further lowering the processing complexity and improving the production and processing efficiency.

The technical solutions in the embodiments of this application can further realize the following technical effects:

Moreover, the technical solutions in the embodiments of this application can further reduce the probability of damages to the rotating shaft in the embodiments herein by use of flexible connection belts. When the first rotating shaft and the second rotating shaft take irregular relative motions under external force, it is possible to exert a counterforce through the strong adaptability for synchronization between the first rotating shaft and the second rotating shaft. The solution has the technical effect of further tucking the rotating shaft structure at the same time.

Moreover, the technical solution in the embodiments of this application can further enhance the interaction between the transmission belt and the first and second rotating shafts by the means that the transmission belt is figure-8 sheathed between the first and second rotating shafts. The solution can enhance the technical effects of sensitivity and fitness between the first and second rotating shafts during synchronization.

Furthermore, for the technical solution in the embodiments of this application, a through-hole is drilled on the transmission belt and a portion of the transmission belt constituting an "8" shape runs through the through-hole to improve the convergent degree of the transmission belt, so the solution highlights the technical effects of improving the space utilization efficiency of the rotating shaft.

Moreover, for the technical solution in the embodiments of this application, a convex gear and a mating part can be further arranged respectively on the transmission belt and the shaft so that the transmission belt is engaged with the shaft for synchronization between the first and second rotating shafts; therefore, the solution can validly increase the friction force between the transmission belt and the shaft to improve the technical effect of synchronous sensitivity.

Moreover, for the technical solution in the embodiments of this application, at least one groove is arranged on the first and/or second rotating shaft(s) and the transmission belt is sheathed in one groove at least to fix the belt between the first and second rotating shafts, or the transmission belt may slip away leading to invalidity when the belt actuates the synchronous motions of the first and second rotating shafts; and the solution has the technical effects of validly reducing the fault possibility of the rotating shaft in this application.

Moreover, for the technical solution in the embodiments of this application, at least one groove can be a spiral groove around the shaft so that the force applied on the transmission belt decreases with the technical effects of extending the rotating shaft service life when the first and/or second rotating shaft(s) rotates to the same radian.

Moreover, for the technical solution in the embodiments of this application, the transmission belt can be made of metal materials with better resistance to tension and weather so as to get the technical effects of extending the service life and expanding the applicable scope related to the rotating shaft in this application.

Although the preferred embodiments of the present invention have been illustrated, those skilled in the art can make additional variations and modifications once the basic inventive concepts have been learned. Therefore, the appended claims are intended to explain the preferred embodiments including all variations and modifications that fall within the scope of the present invention.

It is obvious that different variations and modifications of the present invention by those skilled in the art will not depart from the spirit and the scope of the present invention. Therefore, if these modifications and variations belong to the claims of the present invention and within the scope of the technical equivalents of the present invention, the present invention further intends to include such modifications and variations.

What is claimed is:

1. A connecting apparatus, comprising:
 a first shaft comprising a first fixing body for fixing the first shaft to a first body of an electronic device, and a first cylindrical shaft body fixed to one end of the first fixing body;
 a second shaft comprising a second fixing body for fixing the second shaft to a second body of the electronic device, and a second cylindrical shaft body fixed to one end of a second fixing body; and
 means for directly connecting the first cylindrical shaft body of the first shaft and the second cylindrical shaft body of the second shaft, wherein the first cylindrical shaft body and the second cylindrical shaft body each comprise a unitary arrangement, wherein, as a function of the means for directly connecting, the first cylindrical shaft body of the first shaft and the second cylindrical shaft body of the second shaft achieve a synchronous rotation.

2. The connecting apparatus according to claim 1, wherein:
 the means for directly connecting is at least one pair of connecting strips; and
 wherein the at least one pair of connecting strips are directly connected to the first cylindrical shaft body and the second cylindrical shaft body in the unitary arrangements.

3. The connecting apparatus according to claim 1, wherein the first fixing body has at least one first fixing structure engaged with at least one second fixing structure on the first body so as to fix the first shaft to the first body; and
 wherein the second fixing body has at least one third fixing structure engaged with at least one fourth fixing structure on the second body so as to fix the second shaft to the second body.

4. The connecting apparatus according to claim 3, wherein the at least one second fixing structure is at least one first fixing hole and the at least one first fixing structure is at least one first fixing plug; or
 wherein the at least one second fixing structure is at least one first fixing plug and the at least one first fixing structure is at least one first fixing hole.

5. The connecting apparatus according to claim 1, wherein the first cylindrical shaft body comprises: a plurality of first cylindrical shaft columns that each have a first diameter, and at least one first cylindrical shaft connecting section having a second diameter that connects adjacent pairs of the first cylindrical shaft columns to each other; wherein the first diameter is larger than the second diameter; and
 wherein the second cylindrical shaft body comprises a plurality of second cylindrical shaft columns having a third diameter and at least one second cylindrical shaft connecting section having a fourth diameter that connects adjacent pairs of the second cylindrical shaft columns to each other; wherein the third diameter is larger than the fourth diameter; and
 wherein the means for directly connecting is at least one pair of connecting strips; and
 wherein the at least one pair of connecting strips directly connects to the at least one first cylindrical shaft connecting section and to the at least one second cylindrical shaft connecting section.

6. The connecting apparatus according to claim 5, further comprising:
 at least one first through hole arranged on each of the at least one first cylindrical shaft connecting sections;
 at least one second through hole arranged on each of the at least one second cylindrical shaft connecting sections; and
 wherein the at least one pair of connecting strips is threaded through the at least one first through hole and the at least one second through hole.

7. The connecting apparatus according to claim 5, wherein a first pair of the at least one pair of connecting strips comprises a first connecting strip and a second connecting strip that is different from the first connecting strip;

wherein the first connecting strip is disposed in a first region along a first direction of an axis of one of the first shaft and the second shaft and between the first cylindrical shaft connecting section and the second cylindrical shaft connecting section; and wherein the second connecting strip is disposed in a second region along a second direction of the axis of one of the first shaft and the second shaft and between the first cylindrical shaft connecting section and the second cylindrical shaft connecting section.

8. The connecting apparatus according to claim 7, wherein, when the first body and the second body are positioned in a closed state relative to each other, a first end of the first connecting strip is fixed at a first position of the first cylindrical shaft connecting section, a second end of the first connecting strip is fixed at a second position of the second cylindrical shaft connecting section, a third end of the second connecting strip is fixed at a third position of the first cylindrical shaft connecting section, and a fourth end of the second connecting strip is fixed at a fourth position of the second cylindrical shaft connecting section;

wherein a connection line of axis centers the first shaft and the second shaft intersects with an outer periphery of the first cylindrical shaft connection section at the first position, intersects with an outer periphery of the second cylindrical shaft connection section at the second position; and wherein the first connecting strip is wound around the cylindrical shaft body of the second cylindrical shaft connecting section along the first direction from the first position to the second position; and the second connecting strip is wound around the cylindrical shaft body of the first cylindrical shaft connecting section along the second direction from the fourth position to the third position.

9. The connecting apparatus according to claim 8, wherein, when the first body and the second body are at the closed state relative to each other, a first angle between the first body and the second body is zero degrees; and wherein when an external force drives the first shaft of the connecting apparatus to rotate in the first direction, the first connecting strip pulls the second shaft to rotate in the second direction of the second shaft, and the fourth end of the second connecting strip is wound around the cylindrical shaft body of the second shaft along the second direction, so that the first angle is adjusted from zero degrees to a first open angle.

10. An electronic device, comprising:
a first body;
a second body; and
a connecting apparatus comprising: a first shaft fixed to the first body comprising a first cylindrical shaft body, a second shaft fixed to the second body comprising a second cylindrical shaft body, and means for directly connecting the first cylindrical shaft body and the second cylindrical shaft body, and the first cylindrical shaft body and the second cylindrical shaft body each form a unitary arrangement; and
wherein, based on the means for directly connecting, the first cylindrical shaft body of the first body and the second cylindrical shaft body of the second body achieve synchronous rotation via the first shaft and the second shaft.

11. A rotating shaft, comprising:
a first rotating shaft comprising a first fixing body configured to connect to a first main body of an electronic device and comprising a first cylindrical shaft body fixed to one end of the first fixing body;
a second rotating shaft comprising a second fixing body configured to connect to a second main body of the electronic device and comprising a second cylindrical shaft body fixed to one end of the first fixing body; and
means for directly connecting the first cylindrical shaft body of the first rotating shaft and the second cylindrical shaft body of the second rotating shaft that is sheathed between the first cylindrical shaft body of the first rotating shaft and the second cylindrical shaft body of the second rotating shaft and synchronizes torques of the first rotating shaft and the second rotating shaft, wherein each of the first cylindrical shaft body and the second cylindrical shaft body form a unitary arrangement.

12. The rotating shaft according to claim 11, wherein the means for directly connecting is at least one transmission belt, and wherein the at least one transmission belt is a flexible connecting belt.

13. The rotating shaft according to claim 11, wherein the means for directly connecting is at least one transmission belt, and wherein the at least one transmission belt defines an 8-shape as sheathed between the first cylindrical shaft body of the first rotating shaft and the second cylindrical shaft body of the second rotating shaft.

14. The rotating shaft according to claim 13, wherein a body of the at least one transmission belt defines through-hole, and a portion of the transmission belt runs through the through-hole to form the 8-shape.

15. The rotating shaft according to claim 11, wherein the means for directly connecting is at least one transmission belt, further comprising:
at least one convex tooth arranged on a cylindrical body of at least one of the first cylindrical shaft body of the first rotating shaft and the second cylindrical shaft body of the second rotating shaft; and
wherein the at least one transmission belt is sheathed onto the at least one convex tooth.

16. The rotating shaft according to claim 11, wherein the means for directly connecting is at least one transmission belt, further comprising:
at least one recess hole defined by a cylindrical body of at least one of the first rotating shaft and the second rotating shaft; and
convex pole attached to the at least one transmission belt and corresponding to at least one recess hole, wherein the convex pole is inserted into the at least one recess hole during transmission of the at least one transmission belt in synchronizing the torques of the first rotating shaft and the second rotating shaft.

17. The rotating shaft according to claim 11, wherein the means for directly connecting is at least one transmission belt, further comprising:
at least one shaft tooth is arranged on a cylindrical body of at least one of the first rotating shaft and the second rotating shaft; and
a belt tooth is arranged on the at least one transmission belt that corresponds to and engages the at least one shaft tooth during transmission of the at least one transmission belt in synchronizing the torques of the first rotating shaft and the second rotating shaft.

18. The rotating shaft according to claim 11, wherein the means for directly connecting is at least one transmission belt, further comprising:

at least one groove arranged on a cylindrical body of at least one the first rotating shaft and the second rotating shaft; and wherein the at least one transmission belt is sheathed in the at least one groove.

19. The rotating shaft according to claim 18, wherein the at least one groove is a spiral groove running around the at least one the first rotating shaft and the second rotating shaft.

20. The rotating shaft according to claim 11, wherein the means for directly connecting is at least one transmission belt, and wherein the at least one transmission belt is made of metal materials.

* * * * *